Sept. 12, 1967     E. W. AGIN     3,340,711
HOLLOW PANEL SYSTEM
Filed March 11, 1965     3 Sheets-Sheet 3
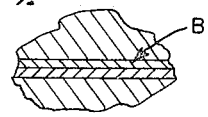
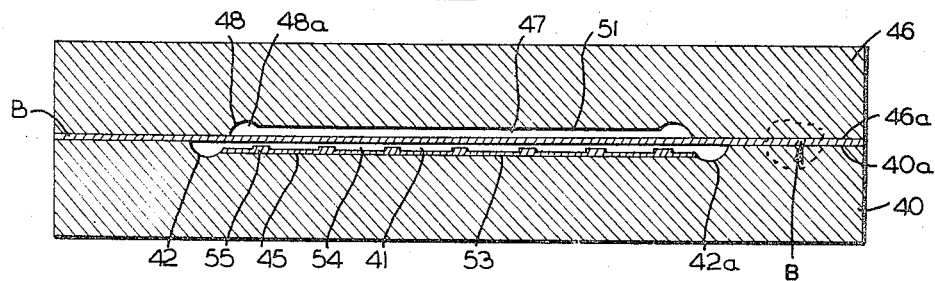
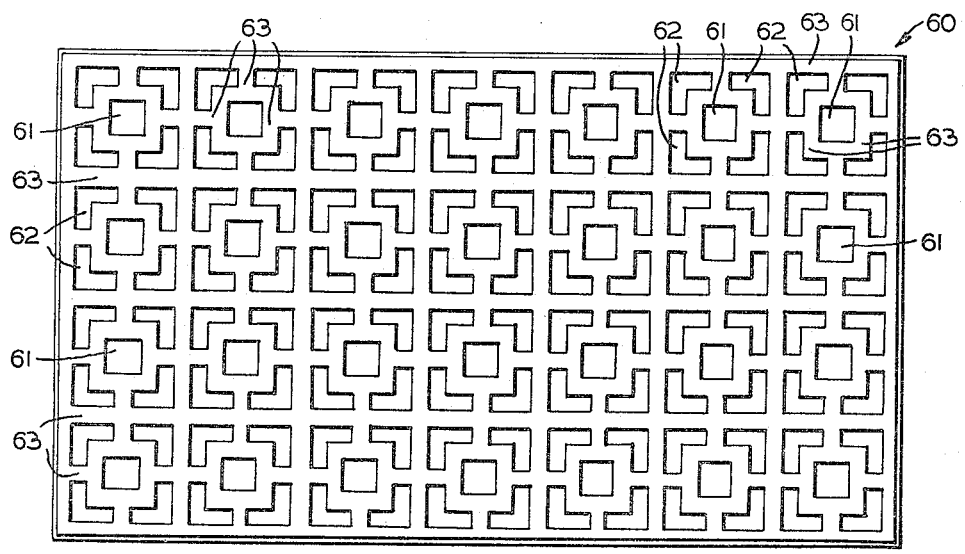
INVENTOR
ERNEST W. AGIN
BY Glenn, Palmer & Matthews
ATTORNEYS

United States Patent Office 3,340,711
Patented Sept. 12, 1967

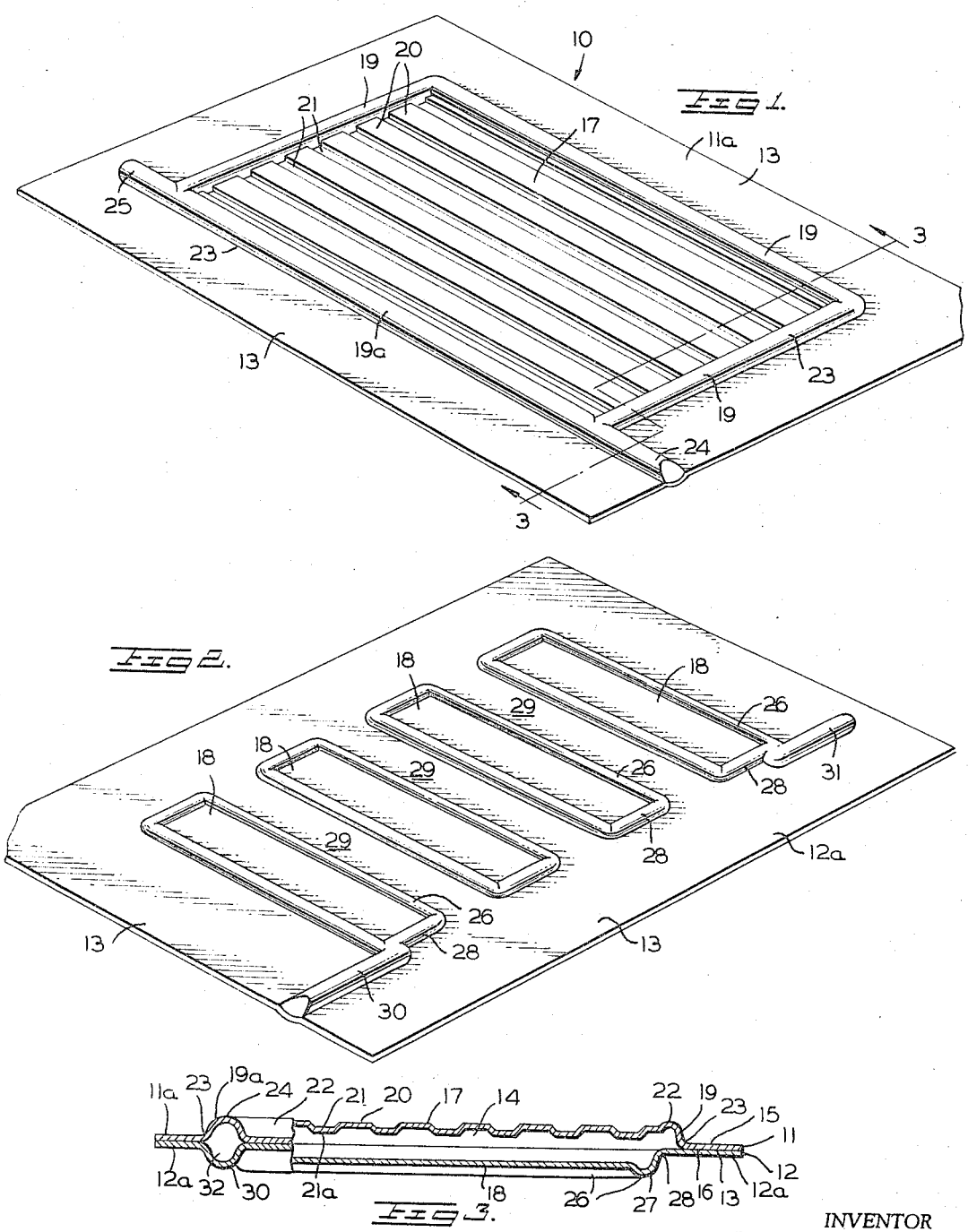

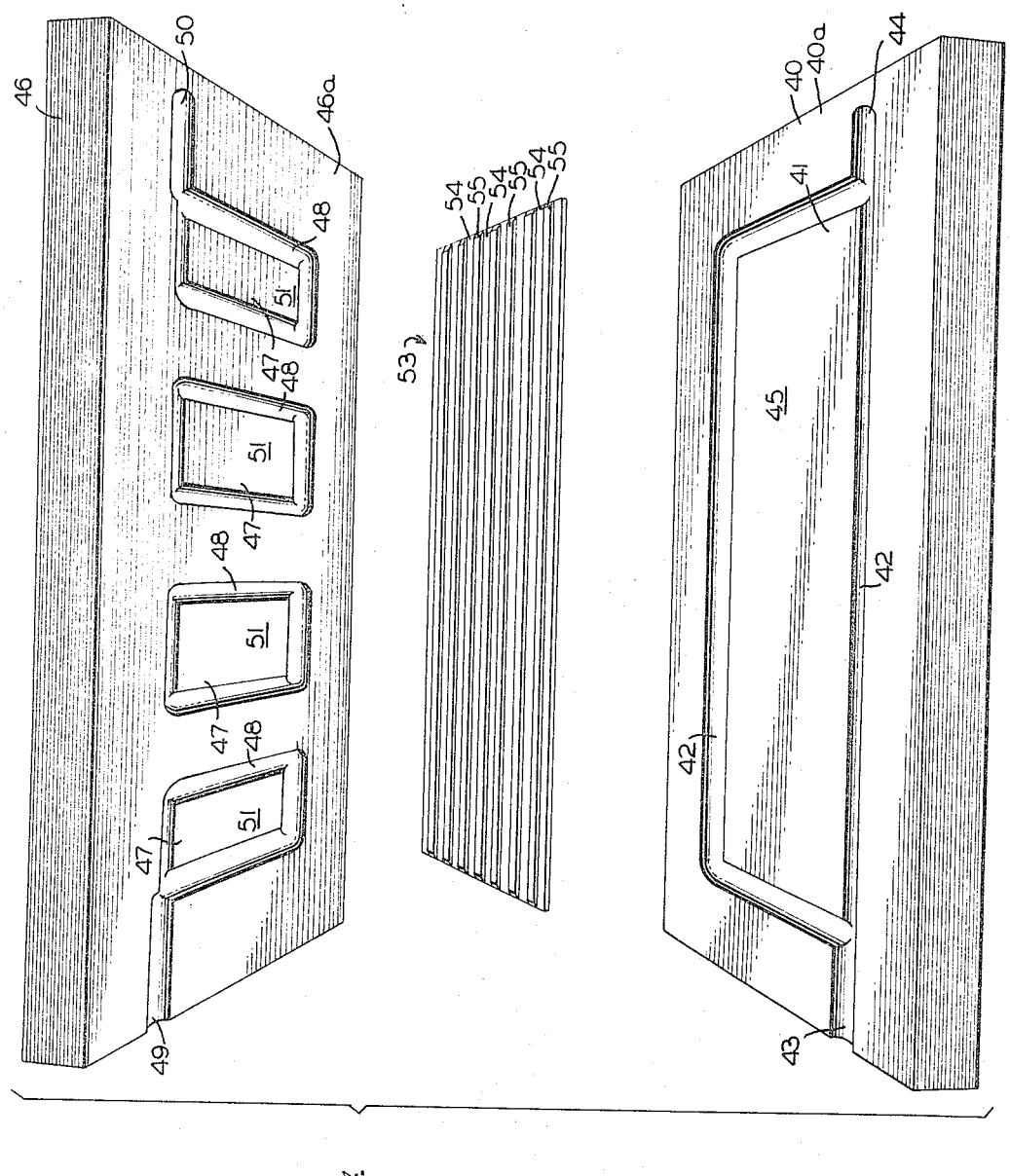

3,340,711
HOLLOW PANEL SYSTEM
Ernest Wilbur Agin, Chesterfield County, Va., assignor to Reynolds Metals Co., Richmond, Va., a corporation of Delaware
Filed Mar. 11, 1965, Ser. No. 438,874
8 Claims. (Cl. 72—61)

ABSTRACT OF THE DISCLOSURE

Method of producing a partially hollow sheet metal panel from a panel blank having a pair of metal sheets bonded face to face, using a pattern template providing a configuration to be imparted to one of the sheets and inflating the blank to separate the sheets and displace one of them into engagement with the template.

---

This invention relates to partially hollow panel structures produced from bonded inflatable sheet laminations and which may be used as structural panels or the like.

According to the present invention a panel is produced from a bonded inflatable sheet lamination, preferably aluminum, in a manner whereby a light weight, partially hollow panel is produced. The panel is formed with decorative and structural characteristics which render the panel highly desirable for use as a structural component. Relatively thin light weight panels of the character herein set forth are highly desirable for use in constructions where decorativeness is required and strength of the panel against bending and twisting is essential. For example, in certain home appliances, characteristics of light weight, attractiveness, stability, and economy of production are desirable in as much as these are among the features sought by purchasers. Heretofore, lightness in weight of certain components used in appliances has been achieved by use of plastics or thin metallic sheets such as, for example, in refrigerator liners, door shelf rails and freezer and butter compartment doors. It will be appreciated that the use of plastics and thin metal components results in structural elements having less than desirable strength characteristics whereby a user of the appliance must be extremely careful to avoid bending of metal components and cracking or chipping of plastic components. Further, to achieve decorativeness of components of the nature mentioned, which often are exposed to view in an appliance, chemical etching or enameling of metallic components is employed as is the use of color pigmented and painted plastics. Further, the provision of decorative surface contours on plastic components requires preparation and use of expensive, accurately machined molds. Thus, it will be appreciated that considerable effort and expense is involved in producing decorative metal and plastic components of the character set forth.

The present invention advantageously provides for the production of sheet metal panel possessing the desirable characteristics mentioned above. More particularly, according to the present invention there is provided a relatively thin walled light weight structural panel which is partially hollow and which has integral decorative designs embossed on one or both sides thereof and possesses structural characteristics which impart considerable strength to the panel. The panel is economically produced from a bonded laminate of sheet metal, preferably aluminum, by inflating the laminate between die components. Accordingly, panels of the character herein set forth can be formed at a considerable rate of production and with a minimum of labor requirements. Further, certain embodiments of the present invention provide for selectively changing the design imparted to the panels without changing the basic die components employed in the inflation process. In addition to providing versatility, this feature promotes the economical production of such panels.

An object of this invention is to provide a method of producing a partially hollow sheet metal panel from a bonded laminate of sheet material.

A further object is the provision of a method of producing a partially hollow sheet metal panel of the character set forth wherein there is selectivity with regard to the decorative and strengthening embossments imparted to a panel.

Another object is to provide a method of producing a partially hollow sheet metal panel of the character described by introducing fluid under pressure between sheets of a bonded laminate and displacing at least one of the sheets into contact with a pattern template removably associated with a die component adjacent the sheet.

Yet another object is to provide a partially hollow panel of thin gauge sheet metal, which panel is bodily in outer appearance, yet light in weight and integrally reinforced against bending, thus providing a highly desirable structural unit.

A further object is to provide a partially hollow panel of sheet metal wherein the panel includes integral reinforcing and decorative characteristics.

Still a further object is to provide a panel of the character set forth produced from a bonded laminate of sheet metal and wherein portions of the sheets of the laminate are displaced outwardly relative to the bond area between the sheets to provide a decorative and strengthening configuration on the corresponding sheet and, further, wherein the decorative and strengthening configurations of the sheets together provide structural characteristics strengthening the panel as a unit against bending.

Other objects in part will be obvious and in part pointed out more fully hereinafter.

In the accompanying drawing representing certain preferred embodiments of the present invention:

FIGURE 1 is an isometric view of one face of a panel produced in accordance with the present invention;

FIGURE 2 is an isometric view of the opposite face of the panel in FIGURE 1;

FIGURE 3 is an end sectional elevation, of the panel in FIGURES 1 and 2, taken along the line 3—3 in FIGURE 1;

FIGURE 4 is an exploded view of die apparatus and a pattern template adapted to be used in accordance with the present invention to produce the panel illustrated in FIGURES 1, 2 and 3;

FIGURE 5 is a side sectional elevation of the die components and template of FIGURE 4 in assembled relationship and further depicting a panel blank positioned between the die components;

FIGURE 6 is a plan view of a modified form of template for use in producing a panel in accordance with the present invention; and FIGURE 7 is an enlarged fragmentary view showing the panel blank of FIG. 5 in cross-section.

FIGURES 1, 2 and 3 of the drawing illustrate a preferred embodiment of a panel made in accordance with the present invention. The panel 10 is comprised of sheets 11 and 12 preferably of aluminum, which sheets define opposite faces or sides of panel 10. Panel 10 further includes a substantially flat peripheral marginal edge 13 bounding a hollow intermediate portion 14 of the panel. Marginal edge 13 of the panel is defined by marginal edges 11a and 12a of sheets 11 and 12, respectively, which latter edges include inner surfaces 15 and 16, respectively, joined face to face. Hollow portion 14 of the panel includes spaced apart substantially parallel wall portions 17 and 18. Wall portion 17 is bounded by a peripheral rim 19, and wall 17 and rim 19 are defined by displacing the material of sheet 11 intermediate panel edge 13 outwardly of the bond area between sheets 11 and 12. In the embodiment of the panel illustrated in FIGURES 1, 2 and 3, wall 17 includes an embossed design configuration in the form of parallel ribs 20 spaced apart and interconnected by parallel recesses 21, which design is framed by the rim 19. Rim 19 has a top edge 22 spaced above ribs 20 and a bottom edge 23 spaced below bottoms 21a of recesses 21 and merging with the bonded marginal edge of sheet 11. Rim 19 includes rim extensions 24 and 25 which are substantially in axial alignment with respect to one another and at opposite ends of leg 19a of rim 19, for the purpose set forth hereinafter. Wall portions 18 of sheet 12, in the embodiment illustrated in FIGURES 1, 2 and 3, are discrete walls disposed in a common plane and laterally spaced apart and bounded by corresponding rims 26 each having an outermost edge 27 spaced above wall 18 and an innermost edge 28 merging with flat areas 29 of sheet 12 and marginal edge portion 12a of the sheet. Flat areas 29 lie in the plane of marginal edge 12a of sheet 12. The endmost rims 26 are provided with substantially axially aligned rim extensions 30 and 31 which overlie rim extensions 24 and 25, respectively, of rim 21 bounding wall 17 of sheet 11. Rim extension pairs 24 and 30, and 25 and 31, cooperate to define journal means at opposite ends of the panel which may be employed to pivotally mount the panel such as when the panel is to provide a pivotal closure for a container or the like. If the rim extensions are to be so used, it will be understood that the panel edges extending transversely of the axes of the journal means would be trimmed to expose the tubular openings 32 defined by the rim extensions.

It should be noted at this point that the rim extensions 24 and 30 are provided in the panel during production thereof. In this respect, extensions 24 and 30 provide an entrance passageway by which fluid under pressure is introduced between the sheets of the blank to separate and expand the sheets between die components, as set forth hereinafter. It may be desirable in certain instances that the marginal edge 13 of the panel be completely flat about the periphery of the panel. In such cases, rim extensions 25 and 31 can be omitted from the panel, and extensions 24 and 30 can be flattened after the panel is formed. It should be noted too, that panel edge 13 may be shaped such as by bending to serve as means to mount the panel. For example, a portion of the edge may be bent or curled to provide an elongated opening serving as a journal opening for pivotally mounting the panel. Other modifications of the edge of the panel are possible, of course, the above modifications being intended only as examples.

Wall portions 17 and 18 of sheets 11 and 12 together with corresponding rims 19 and 26 serve both to provide the panel with integral decorative facings and integral reinforcing means. In this respect, ribs 20 and recesses 21 of wall portion 17 rigidify the latter portion of sheet 11 against flexing. Similarly, the plurality of rims 26 bounding wall portions 18 of sheet 12 rigidify the latter sheet against flexing in the hollow area of the panel. Further, rim portions 19 and 26 together with the corresponding wall portions cooperate to strengthen the panel as a unit against bending or twisting. It is to be understood that any desired embossed configuration may be imparted to wall 17. Further, one or more of the walls 18 may be provided with embossed configurations of the character imparted to wall 17 and either similar or dissimilar in design with respect to one another. It will be appreciated too that sheet 12 may be a substantially flat sheet without embossments, or be provided with a single wall and rim configuration similar to wall 17 and rim 19 of sheet 11.

A panel of the character described above is produced in accordance with the present invention by introducing a fluid under pressure between a pair of bonded metal sheets which define a panel blank and which are disposed against a die component having a recess provided with a pattern template to impart the desired panel configuration to the blank when the sheets thereof are separated and displaced by the fluid pressure into contact with the pattern template. Suitable die components and pattern means for making the panel illustrated in FIGURES 1, 2 and 3 are depicted in FIGURES 4 and 5 of the drawing. One of the die components 40 is provided with a recess 41 including a rim forming channel 42 and rim extension forming channels 43 and 44, channel 43 of which extends to the edge of die 20 for the purpose set forth hereinafter. Channel 42 bounds a substantially flat bottom surface 45 of recess 41, which surface 45 is disposed above the bottom surface 42a of channel 42 and below the innermost face 40a of die component 40. Face 40a of die component 40 is substantially flat and parallel to surface 45 of recess 41. The other die component 46 is provided, in this instance, with a plurality of recesses 47 each including rim forming channels 48 and the endmost of which include rim extension forming channels 49 and 50, channel 49 of which extends to the edge of die 46. Channels 48 bound substantially flat bottom surfaces 51 of recesses 47, which surfaces 51 are disposed above the bottom surfaces 48a of channels 48 and below the inner face 46a of die component 46. Recesses 47 are spaced apart by flat die face areas 52 lying in the plane of inner face 46a, and face 46a of the die component is substantially parallel to bottom surfaces 51 of recesses 47.

Rim forming channels 48 and bottom surfaces 51 of recesses 47 provide means for forming walls 18 and corresponding rims 26 on sheet 12 of the panel illustrated in FIGURES 1, 2 and 3. Wall portion 17 of the panel is produced by providing pattern means preferably in the form of a template 53 on bottom surface 45 of recess 41, whereby the template is positioned between surface 45 of the recess and inner face 40a of die component 40. Template 53, in this embodiment, includes a plurality of parallel alternately arranged channels 54 and ribs 55 defining, respectively, means for producing ribs 20 and recesses 21 of wall portion 17 of panel 10 when sheet 12 is displaced into contact with die 40 and the pattern template. For the purposes set forth hereinafter, template 53 preferably is removably disposed on surface 45 of recess 41 and is of a thickness less than the spacing between parallel surfaces 40a and 45 of die component 40, whereby the template is spaced from a panel blank B when the die components are in the closed position thereof prior to the inflating process. It will be appreciated that pattern templates of similar or different designs may be disposed on surfaces 51 of recesses 47 if it is desired to impart a configuration to walls 18 other than the flat configuration thereof illustrated in FIGURE 2.

By providing for the use of a removable template such as template 53, panels having different design configurations on the faces thereof can be produced using the same basic die components such as die components 40 and 46. In this respect, a template 60 of the character illustrated in FIGURE 6 of the drawing could readily be substituted for template 53 to provide for producing a panel similar to panel 10 but having a different pattern embossed in wall 17 of sheet 11 of the panel. Template 60 is produced by stamping or otherwise working a sheet of suitable template material to provide longitudinally and transversely aligned and spaced apart openings 61 and spaced apart L-shaped openings 62 in the sheet, which openings 62 are disposed about openings 61. Openings 61 and 62 are bounded by substantially flat uncut portions 63 of the template sheet. Further, the openings may extend partially or completely through the sheet material depending on the particular design configuration desired. Thus, it will be readily apparent that any one of a variety of design patterns can be imparted to a panel made in accordance with the present invention merely by employing a template having the desired pattern cut or otherwise formed therein. The templates may be produced from any material capable of withstanding the crushing force applied thereto by displacing the panel blank sheets into contact therewith. Such materials include, for example, sheets of metal such as aluminum, hard wood sheets, tempered fiberboard, and the like. Preferably, the templates are produced from sheet metal in order to assure that the pattern edges of the template will remain substantially sharp and undamaged under repeated use, whereby a considerable number of panels can be produced using a given template without undesirable defects appearing in the lines of the embossments in the panel faces.

Die component 46 may be modified from the configuration illustrated in FIGS. 4 and 5 depending on the configuration desired to be imparted to the sheet of a panel blank which engages this die component during production of a panel. For example, the die component might be provided with a recess similar to recess 41 of die component 40. Thus, a template could be inserted in each of the die component recesses to provide the desired design configurations on opposite faces of the panel, which design configurations might be similar or dissimilar as desired. Further, die component 46 might be in the form of a substantially flat block having no recesses whatsoever, in which case a panel could be produced having one face thereof flat and the other face provided with a decorative configuration. Other modifications of one or both die components are possible, of course, and the above modifications are to be clearly understood to be illustrative of such modifications only and not as limitations.

In producing a panel in accordance with the present invention a panel blank is first provided, comprised of a pair of substatially flat metallic sheets bonded in face to face relationship. Bonding may be achieved, for example, by rolling the metallic sheets together under pressure sufficient to reduce the thickness of the sheets and establish an integral bond between the sheets throughout the areas of the opposed inner faces of the sheets. A pair of die components are provided, at least one of which includes a recessed portion intermediate the marginal edge of the die and having a substantially flat bottom surface spaced from the innermost face of the die component. A pattern template is disposed on the bottom surface of the recess, and the panel blank is then positioned between the die components to overlie the recess in the one die component and the die components are closed on one another as illustrated in FIGURE 5 to tightly clamp the marginal edge of the blank (FIG. 7) between the innermost faces of the die components. The blank, of course, is of a length and width sufficient to span the recess in the one die component. An inflation needle connected to a source of fluid under pressure, such as water, is then introduced between the sheets of the panel blank in the area of the bond therebetween and into the extension forming channels such as channels 43 and 49 of die components 40 and 46, which extension forming channels extend to the die edges for this purposes. The fluid under pressure is then released for passage through the inflation needle and the bonded sheets of the blank are separated by the pressurized fluid and displaced relative to one another and into engagement with the corresponding die component, whereby, one sheet, at least, is embossed by engagement with the pattern template. The bond between the marginal edges of the sheets is maintained by applying closing pressure to the die components of a magnitude sufficient to prevent separation of the sheets in the area of the marginal edge of the blank during the inflation process. Thus, a panel is produced having a substantially flat marginal edge bounding a hollow intermediate portion.

When it is desired to produce a panel in which one face has discrete embossments of the character of discrete walls 18 and rims 26 of panel 10 illustrated in FIGURE 2, it is advantageous and sometimes even necessary that the pattern means 53 for embossing the opposite face of the panel be disposed below the innermost flat face 40a of the die component 40. In this respect, when a panel blank B is positioned over the recess in which a pattern template is disposed, there preferably exists a space of about .050 inch between the pattern template and the adjacent sheet of the blank. When die components 40 and 46 are closed on the blank, flat faces 46a and 52 of die 46 engage the adjacent sheet of the blank. It will be appreciated, therefore, that if a template or other pattern means of the character indicated in FIGURE 6 were associated with die component 40, without the spacing between the template and panel blank, water under pressure introduced between the sheets of the blank could not pass between the discrete recesses 47 of die 46. Thus, the spacing provides for the sheets to separate in the area of the die faces 52 to establish a path for the fluid between recesses 47 permitting progressive expansion of the material of the adjacent sheet of the blank into each of the recesses 47. Of course, if a template is employed such as template 53 having parallel channels 54 extending transversely of discrete recesses 47, the spacing between the template and panel blank may not be necessary. In this respect, the template channels, as the adjacent sheet of the blank is displaced thereinto, under certain circumstances could provide passageways between recesses 47 for the fluid. Whether such template channels would adequately serve as fluid passageways would depend upon such factors as the strength of the sheets of the blanks and the strength of the bond therebetween, the pressure of the inflating fluid, and the dimensions of the passageways provided by the template.

In a specific example of a partially hollow panel made in accordance with the present invention, a pair of sheets of aluminum alloy 5457 were rolled under pressure sufficient to integrally bond the sheets and produce a laminate having a composite thickness of .045 inch. The laminate was cut to blank size and positioned between die components 40 and 46 illustrated in FIGURES 4 and 5. A template similar to template 53 was placed between the blank and die component 40. The blank was then inflated by introducing fluid under pressure between the sheets to separate the sheets in the bond area and displace the sheets toward the corresponding die cavity. The walls of the hollow portion of the panel measure approximately .0225 inch in thickness. Yet the panel, in the region of the hollow portion, exhibited considerable resistance to flexing due to the embossed wall. Further, the panel as a unit resisted bending due to the rim portions bounding the walls.

Although considerable emphasis has been placed herein on the fact that the panel is produced from a blank defined by aluminum sheets integrally bonded face to face, it is to be clearly understood that metallic sheets other than aluminum may be used. Further, the sheets of the panel blank may be joined other than by bonding the sheets under pressure. Still further, the sheets of the blank may be joined about the periphery thereof only, leaving the intermediate hollow forming portions of the blank unbonded. Moreover, the pattern template for imparting embossments to the panel will need not be a removable element but may be integrally formed in the die cavity or formed as a separate component and permanently mounted in place with respect to the die cavity or recess.

As many possible embodiments of the present invention may be made and many possible changes made in the embodiments herein set forth, it is to be distinctly understood that all matter described herein is to be interpreted as illustration and not as a limitation.

I claim:

1. A method of producing a partially hollow sheet metal panel having an embossed panel face from a panel blank defined by a pair of metal sheets bonded face to face comprising, providing a die component having a recess and a substantially flat die face surrounding said recess, providing a pattern template in said recess, positioning a panel blank against said die face and in covering relationship with said recess, maintaining the area of said blank surrounding said recess under pressure against said die face, and introducing fluid between the sheets of said blank under pressure sufficient to separate said sheets in the area of said recess and displace the material of the one of said sheets adjacent said recess into engagement with said pattern template for said one sheet to be embossed substantially in conformity with the configuration of said pattern template.

2. A method according to claim 1, wherein said pressure maintaining said area of said blank surrounding said recess against said die face is sufficient to prevent separation of said sheets of said blank in said area surrounding said recess.

3. A method of producing a partially hollow sheet metal panel from a panel blank defined by a pair of metal sheets bonded face to face comprising, providing a die component having a recess and a substantially flat die face surrounding said recess, removably positioning a pattern template in said recess and spaced inwardly from said die face, said pattern template having a configuration to be imparted to one of the sheets of a panel blank, positioning a panel blank against said die face and in covering relationship with said recess, maintaining the area of said blank surrounding said recess against said die face under pressure, and introducing fluid between the sheets of said blank under pressure sufficient to separate said sheets in the area of said recess and displace the material of the one of said sheets adjacent said recess into engagement with said pattern template for said one sheet to be embossed substantially in conformity with the configuration of said pattern template, said pressure maintaining said area of said blank against said die face being sufficient to prevent separation of said sheets of said blank in said area surrounding said recess.

4. A method according to claim 3, wherein said fluid is water.

5. A method of producing a partially hollow sheet metal panel having an embossed panel face from a panel blank defined by a pair of metal sheets bonded face to face comprising, providing a pair of opposed die components at least one of which includes a recess in the surface thereof facing the other die component, providing removable pattern means in said recess having a configuration to be imparted to one of the sheets of a blank, positioning a blank between said die components and closing said die components to engage opposite sides of said blank, and introducing fluid between the sheets of said blank under pressure sufficient to separate said sheets in the area of said recess and to displace the one of said sheets adjacent said recess into engagement with said pattern means to impart embossments to said one sheet corresponding to the configuration of said pattern means.

6. A method according to claim 2, and maintaining said die components closed under sufficient pressure to prevent separation of said sheets in the area thereof surrounding said recess.

7. A method of producing a partially hollow sheet metal panel having embossed panel faces from a panel blank defined by a pair of metal sheets bonded face to face comprising, providing a pair of opposed die components having opposed recesses surrounded by substantially flat die faces, providing a pattern template in one of said recesses having a configuration to be imparted to one of the sheets of a panel blank, positioning a blank between said die components to be in covering relationship with said recesses and closing said die components for said flat die faces to engage opposite outer surfaces of the sheets of said blank, and introducing fluid between said sheets of said blank under pressure sufficient to separate said sheets in the areas of said recesses and to displace the material of the one of said sheets adjacent said one recess into engagement with said pattern template for said one sheet to be embossed substantially in conformance with the configuration of said pattern template and to simultaneously displace the material of the other of said sheets into the other of said recesses for said other sheet to be embossed substantially in conformance with the configuration of said other of said recesses.

8. A method of producing a partially hollow sheet metal panel having embossed panel faces from a panel blank defined by a pair of metal sheets bonded face to face comprising, providing a first die component having a recess bounded by a substantially flat die face and providing a second die component having a plurality of discrete recesses bounded by substantially flat die face portions lying in a common plane and opposed to the die face of said first die component, providing a pattern template in said recess in said first die component and below said die face of said first die component and having a configuration to be imparted to one of the sheets of the panel blank, positioning a panel blank between said die components to be in covering relationship with respect to said recesses in said die components and closing said die components for opposite faces of the blank to be engaged between said die face of said first die component and said die face portions of said second die component, and introducing fluid between the sheets of said blank under pressure sufficient to separate said sheets in the areas of said recesses in said die components and to displace the material of the one of said sheets adjacent said recess in said first die component into engagement with said pattern template for said one sheet to be embossed in conformity with the configuration of said pattern template and to simultaneously displace the material of the other of said sheets into the discrete recesses in said second die component for said other sheet to be embossed in conformity with the configuration of said discrete recesses.

References Cited

UNITED STATES PATENTS

| 2,582,358 | 1/1952 | Schoellerman | 29—421 |
| 3,094,956 | 6/1963 | Pauls | 72—54 |
| 3,140,532 | 7/1964 | Adams | 29—157.3 |
| 3,228,223 | 1/1966 | Heuer | 72—61 |

CHARLES W. LANHAM, *Primary Examiner.*

K. C. DECKER, *Assistant Examiner.*